United States Patent
Numata (10) Patent No.: US 7,523,120 B2
(45) Date of Patent: Apr. 21, 2009

(54) RECORDING MEDIUM IN WHICH DOCUMENT MANAGEMENT PROGRAM IS STORED, DOCUMENT MANAGEMENT METHOD, AND DOCUMENT MANAGEMENT APPARATUS

(75) Inventor: Kenichi Numata, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 341 days.

(21) Appl. No.: 11/076,979

(22) Filed: Mar. 11, 2005

(65) Prior Publication Data

US 2006/0010129 A1    Jan. 12, 2006

(30) Foreign Application Priority Data

Jul. 9, 2004    (JP) .............................. 2004-203980

(51) Int. Cl.
    *G06F 17/00*    (2006.01)
(52) U.S. Cl. ...................... 707/101; 707/102; 707/104.1
(58) Field of Classification Search ........................ None
    See application file for complete search history.

(56) References Cited

U.S. PATENT DOCUMENTS

| 5,768,580 | A  | * | 6/1998 | Wical ........................... 707/102 |
| 6,101,515 | A  | * | 8/2000 | Wical et al. .................. 715/531 |
| 6,430,575 | B1 | * | 8/2002 | Dourish et al. .............. 707/200 |
| 6,983,277 | B2 | * | 1/2006 | Yamaguchi et al. ............ 707/8 |
| 2001/0018690 | A1 | * | 8/2001 | Tung Ng et al. ......... 707/103 Y |
| 2002/0078044 | A1 | * | 6/2002 | Song et al. ..................... 707/6 |
| 2002/0174127 | A1 | * | 11/2002 | Preiss et al. ................. 707/100 |
| 2002/0174142 | A1 | * | 11/2002 | Demers et al. .............. 707/509 |
| 2003/0014388 | A1 | * | 1/2003 | Shih et al. ..................... 707/1 |
| 2004/0143588 | A1 | * | 7/2004 | Russell ....................... 707/100 |

FOREIGN PATENT DOCUMENTS

JP    A 2003-281403    10/2003

OTHER PUBLICATIONS

Urbano, Randy, "Oracle Database Advanced Replication, 10g Release (10.1)", Oracle Corporation, 2003, pp. 40-60.*

* cited by examiner

*Primary Examiner*—Tim T Vo
*Assistant Examiner*—Michelle Owyang
(74) *Attorney, Agent, or Firm*—Oliff & Berridge, PLC (57) ABSTRACT

The present invention provides a recording medium readable by a computer, the recording medium storing a document management program executable by the computer to perform a function for classifying and managing documents, the function including: storing classification scheme information representing a predetermined classification scheme; using, as a reference source database, at least one external database that classifies and manages documents, and acquiring, as reference source classification scheme information, information relating to the classification scheme of the documents at the reference source database; determining, on the basis of the acquired reference source classification scheme information, a way to change the stored classification scheme information; and changing the stored classification scheme information on the basis of the determined way of the changes.

9 Claims, 4 Drawing Sheets

RECORDING MEDIUM IN WHICH DOCUMENT MANAGEMENT PROGRAM IS STORED, DOCUMENT MANAGEMENT METHOD, AND DOCUMENT MANAGEMENT APPARATUS

BACKGROUND OF THE INVENTION (1) Field of the Invention

The present invention relates to a recording medium in which a document management program is stored, a document management method and a document management apparatus that classify and manage documents.

(2) Description of the Related Art

In recent years, with respect to the management of documents using computers, it has become common to classify and manage those documents using a hierarchical directory structure. For example, news documents maybe classified into two categories, "domestic" and "foreign", and "domestic" news documents may be further classified into categories such as "national", "economy", and so on.

However, there has been the following problem in managing documents using conventional hierarchical directory structures. Namely, when documents that is not classified into the current classification scheme is created, the system administrator must create a new category for each of those documents.

Also, when the number of documents to be classified suddenly increases with respect to a specific category in a set period of time, there is no way for the user to know that category until the user just happens to discover the category, even if it is assumed that the utility value of documents classified to that category or the utility value of the category itself is rising.

SUMMARY OF THE INVENTION

The present invention has been made in view of the above circumstances and provides a recording medium in which a document management program is stored, a document management method and a document management apparatus that are configured to improve convenience.

According to an aspect of the invention, the invention provides a recording medium readable by a computer, the recording medium storing a document management program executable by the computer to perform a function for classifying and managing documents, the function including: storing classification scheme information representing a predetermined classification scheme; using, as a reference source database, at least one external database that classifies and manages documents, and acquiring, as reference source classification scheme information, information relating to the classification scheme of the documents at the reference source database; determining, on the basis of the acquired reference source classification scheme information, a way to change the stored classification scheme information; and changing the stored classification scheme information on the basis of the determined way of the changes.

According to another aspect of the present invention, a document management method of classifying and managing documents, the method includes: storing classification scheme information representing a predetermined classification scheme using, as a reference source database, at least one external database that classifies and manages documents, and acquire, as reference source classification scheme information, information relating to the classification scheme of the documents at the reference source database; determining, on the basis of the acquired reference source classification scheme information, a way to change the stored classification scheme information; and changing the stored classification scheme information on the basis of the determined way of the changes.

Further, according to another aspect of the present invention, a document management apparatus for classifying and managing documents, the document management apparatus includes: a memory that stores classification scheme information representing a predetermined classification scheme; an acquisition unit that uses, as a reference source database, at least one external database that classifies and manages documents, and acquires, as reference source classification scheme information, information relating to the classification scheme of the documents at the reference source database; a determination unit that determines, on the basis of the acquired reference source classification scheme information, a way to change the stored classification scheme information; and a changing unit that changes the stored classification scheme information on the basis of the determined way of the changes when it has been decided by the determination unit to conduct changes.

BRIEF DESCRIPTION OF THE DRAWINGS

An embodiment of the invention will be described in detail below on the basis of the following drawings, wherein.

DETAILED DESCRIPTION OF THE INVENTION

Figure 1:
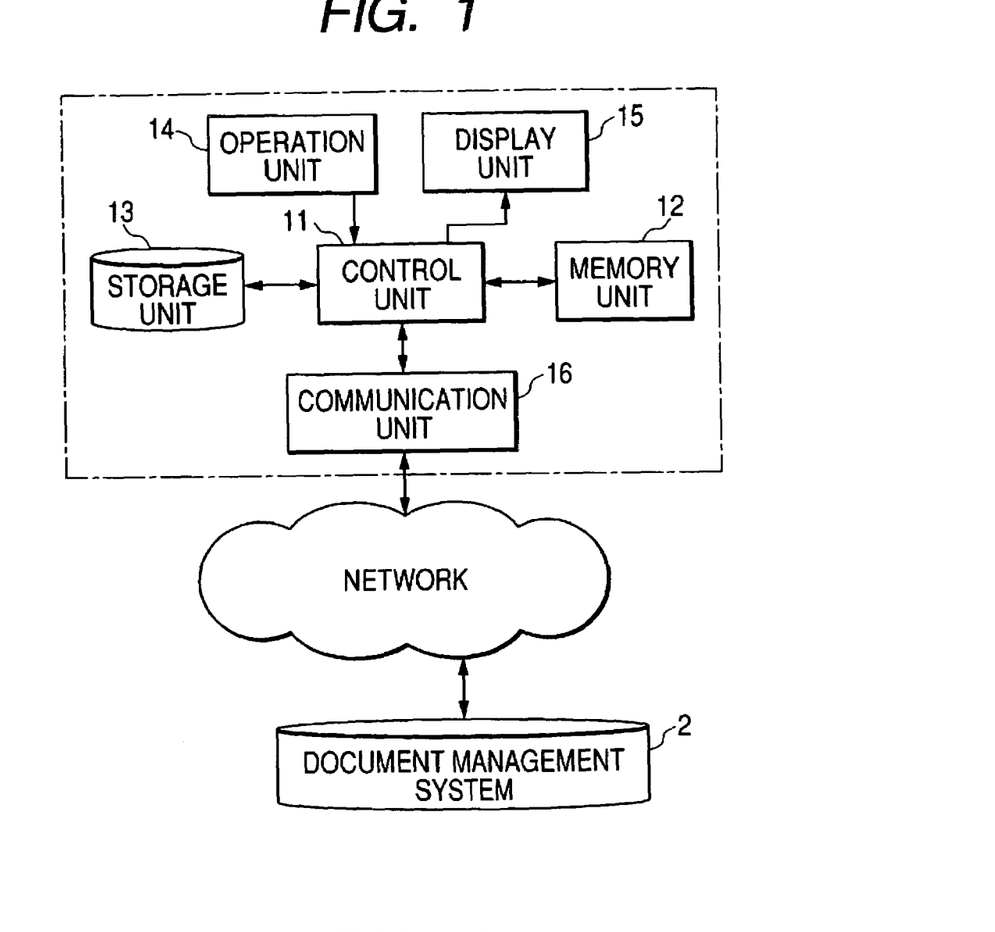
FIG. 1 is a block diagram showing an example of a document management apparatus pertaining to an embodiment of the invention.

An embodiment of the invention will now be described with reference to the drawings. As shown in FIG. 1, the document management apparatus pertaining to the embodiment of the invention is connected to another document management system 2 via a network. The document management apparatus is configured to include a control unit 11, a memory unit 12, a storage unit 13, an operation unit 14, a display unit 15 and a communication unit 16.

The control unit 11 may be realized using a CPU, and operates in accordance with a program stored in the memory unit 12. In the present embodiment, the control unit 11 executes processing (adjustment processing) that uses at least one other document management system 2 as a reference source and adjusts, on the basis of changes in the directory structure at that reference source, the directory structure of the document database stored in the storage unit 13. The control unit 11 also executes processing (guidance processing) that checks the increase of the number of documents in each directory at the reference source, and generates and presents guidance information that provides guidance through some of the directories of the document database stored in the storage unit 13. The specific content of the adjustment processing and guidance processing will be described in detail later. The memory unit 12 may be realized by a memory device, such as a RAM (Random Access Memory) or a ROM (Read-only Memory), and a hard disk. A program executed by the control unit 11 is retained in the memory unit 12. The memory unit 12 also operates as a work memory that retains various data used in the processing of the control unit 11.

The storage unit 13 may be realized by a device such as a hard disk and retains the document database. Specifically, the storage unit 13 classifies and manages, as the document database, plural documents with a hierarchical directory structure.

The operation unit 14 may be realized by a mouse and a keyboard. The operation unit 14 is operated by the user and outputs the content of that operation to the control unit 11. The display unit 15 is a display device that displays and outputs information in accordance with an instruction inputted from the control unit 11. The communication unit 16 is connected to the network and transmits and outputs data via the network in accordance with an instruction inputted from the control unit 11. The communication unit 16 also receives incoming data via the network and outputs the data to the control unit 11.

Here, the detail of the operation of the control unit 11 of the document management apparatus of the present embodiment will be described. In the present embodiment, the control unit 11 uses, as a reference source, at least one other document management system accessible via the network and acquires information relating to the classification scheme of the documents at the document database (reference source database) managed by the reference source. The information relating to the classification scheme here is a hierarchical directory structure, and the control unit 11 acquires each directory name and the hierarchical relation of the directories (information identifying sub-directories belonging to each directory).

The control unit 11 generates an association table in which are mutually associated the directories included in the classification scheme of the reference source database and the directories included in the classification scheme of the document database stored in the storage unit 13, and saves the association table in the memory unit 12.

Figure 2:
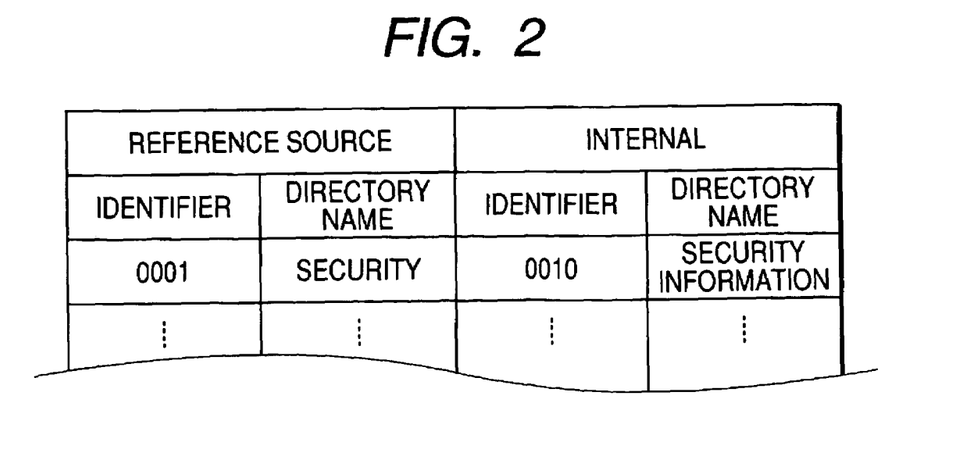
FIG. 2 is an explanatory diagram showing an example of an association table.
Figure 3A:
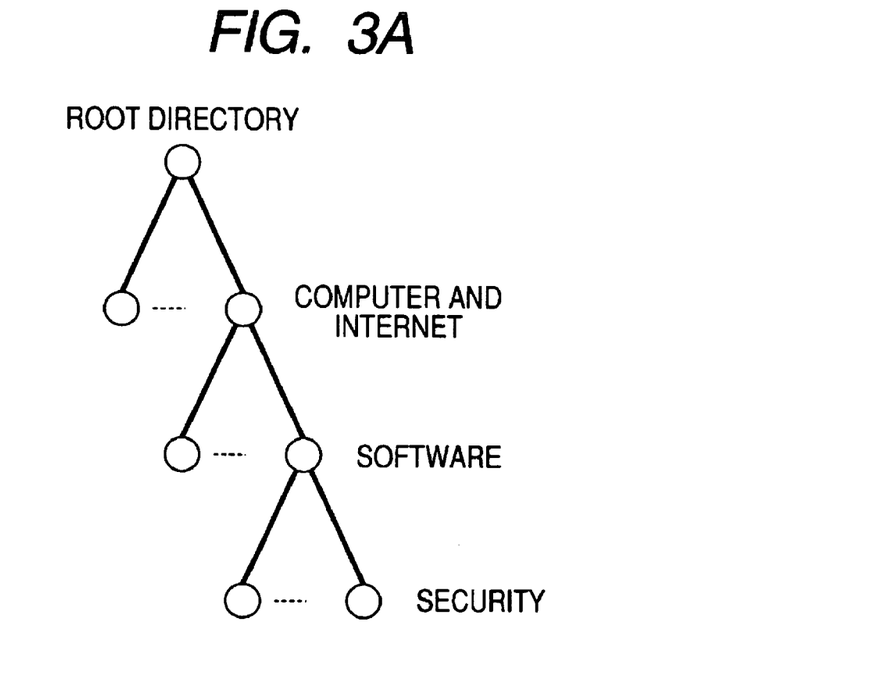
FIGS. 3A and 3B are explanatory diagrams showing examples of classification scheme information.
Figure 3B:
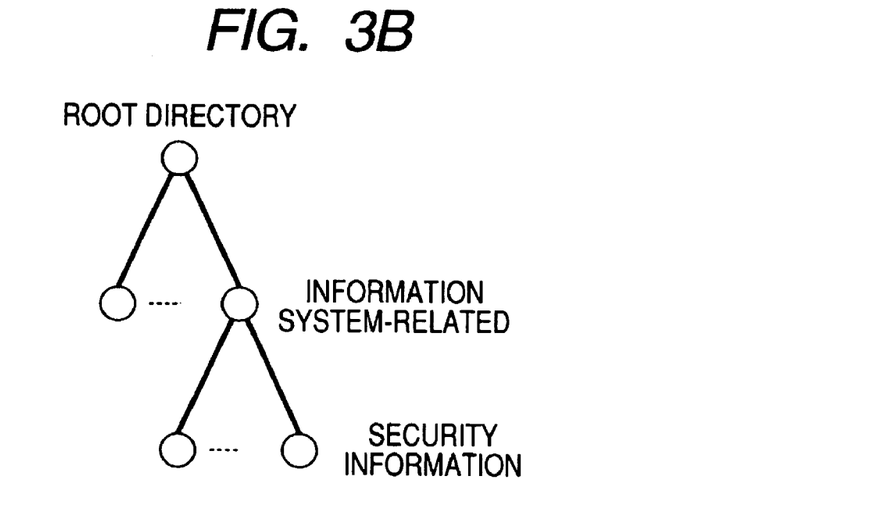

Specifically, as shown in FIG. 2, the association table is a table in which is associated directory information including an identifier and a directory name uniquely allocated to each directory. Here, as shown in FIG. 3A, it will be assumed that in the directory structure of the reference source database (for the purpose of differentiation, this will be called "the reference source classification scheme" below), there is a "Computer and Internet" directory in a root directory, that there is a "Software" directory below the "Computer and Internet" directory, and that there is a "Security" directory below the "Software" directory. As shown in FIG. 3B, it will also be assumed that in the directory structure of the document database stored in the storage unit 13 (this will be called "the internal classification scheme" below), there is an "Information System-Related" directory below the root directory, and that there is a "Security Information" directory below the "Information System-Related" directory.

In this case, when the "Security" directory of the reference source classification scheme and the "Security Information" directory of the internal classification scheme are to be associated, the directory name "Security" and the identifier allocated to the "Security" directory of the reference source classification scheme are respectively associated with the directory name "Security Information" and the identifier allocated to the "Security Information" directory of the internal classification scheme, and these are stored in the association table (FIG. 2). The system administrator may initially conduct association to generate this association table.

The control unit 11 of the present embodiment repeatedly acquires, at a predetermined timing (e.g., every set period of time), information representing the hierarchical directory structure (reference source classification scheme) of the reference source database (identified by the URL (Uniform Resource Locator) or the like of the root directory). This acquisition processing may be done using a method widely known in robot technology where patrol is conducted while links are followed in a designated site. When there is a document (site map) in which the hierarchical directory structure is described in the reference source database, the information of the reference source classification scheme may be acquired by acquiring this document.

The control unit 11 searches the directories included in the reference source classification scheme to see whether or not there is a directory not associated with the directories of the internal classification scheme in the association table. If there is no such directory (when all of the directories included in the reference source classification scheme are associated with the directories of the internal classification scheme), then the control unit 11 ends the internal classification scheme adjustment processing.

If, among the directories included in the reference source classification scheme, there is a directory not associated with the directories of the internal classification scheme in the association table, then the control unit 11 decides to add, to the internal classification scheme, a directory corresponding to the unassociated directory of the reference source classification scheme (called "the reference source new directory").

When the control unit 11 decides to add a new directory to the internal classification scheme and change the internal classification scheme, the control unit 11 conducts the following processing to determine the position where the directory is to be created. First, the control unit 11 references the reference source classification scheme information to identify the parent directory of the reference source new directory. Then, the control unit 11 identifies the directory of the internal classification scheme (called "the internal corresponding parent directory") associated with the identified parent directory with reference to the association table. The control unit 11 creates a new directory corresponding to the reference source new directory in the directory of the internal classification scheme identified by this processing.

For example, with respect to the examples shown in FIGS. 3A and 3B, it will be assumed that a "Password Management" directory (corresponding to the reference source new directory) has been newly added below the "Security" directory of FIG. 3A. Because this newly added directory is not associated with the directories included in the internal classification scheme, the control unit 11 decides to create, in the internal classification scheme, a new directory corresponding to this "Password Management" directory.

Then, the control unit 11 identifies the parent directory of "Password Management" that is the reference source new directory. The parent directory here is "Security", and the "Security" directory is associated with the "Security Information" directory of the internal classification scheme in the association table. Thus, the control unit 11 creates a new directory corresponding to the reference source new directory below the "Security Information" directory included in the internal classification scheme. Here, the name of the reference source new directory may be used as is for the name of the created directory.

The control unit 11 adds, to the association table, a description in which the directory newly created in the internal classification scheme (newly added directory) is associated with the reference source new directory.

When the control unit 11 has created the new directory in the internal classification scheme, the control unit 11 may then conduct processing to update the classification of the documents included in the document database.

The updating of the classification of the documents may be conducted as follows. The control unit 11 acquires at least one of the documents that the document management system 2 retains in the reference source new directory (called "the reference documents"), and evaluates the relativity between that acquired documents and the documents retained in the storage unit 13 (called "the internal documents"). The evaluation of the relativity here may be done using a widely known method, such as comparing the occurrence rates of words included in the documents.

Then, the control unit 11 moves, to the newly added directory, the internal documents whose relativity with the reference documents acquired from the reference source new directory of the document management system 2 exceeds a predetermined threshold, and reclassifies these internal documents in the category of the newly added directory.

Here, the control unit 11 compares the internal documents with the reference documents in the reference source new directory of the document management system 2, but instead of this, the control unit 11 may also be configured to evaluate the relativity between the name of the newly added directory and the contents of the internal documents in the document database, move internal documents whose relativity exceeds a predetermined threshold to the newly added directory, and reclassify those internal documents to the category of the newly added directory.

In the description up to now, an example has been described where all of the documents in the document database served as comparison targets, but the internal documents to serve as comparison targets may also be limited to some directories, such as documents in the internal corresponding parent directory.

According to the present embodiment, the control unit 11 operates as described above, so that when there is a directory newly added by the document management system 2 (e.g., YAHOO®, etc.) serving as the reference source, the control unit 11 generates a directory corresponding to that category in the internal document database. Then, the control unit 11 rearranges (reclassifies) the documents being retained. Thus, the classification in the document database is updated to match the trend without the system administrator having to conduct an update operation, and the convenience of document management can be improved.

Next, the detail of the guidance processing by the control unit 11 of the present embodiment will be described. The control unit 11 repeatedly acquires, at a predetermined timing (e.g., every set period of time), information representing the hierarchical directory structure (reference source classification scheme) of the reference source database (identified by the URL of the root directory). This acquisition processing may be done using a method widely known in robot technology where patrol is conducted while links are followed in a designated site. When there is a document (site map) in which the hierarchical directory structure is described in the reference source database, the information of the reference source classification scheme may be acquired by acquiring this document.

Then, the control unit 11 acquires the number of document included in the directories included in the reference source classification scheme every predetermined timing (e.g., periodically), and stores this information in the memory unit 12. The control unit 11 checks the increase of the number of documents stored in the memory unit 12, and searches for directories where the increases satisfy a predetermined condition.

Specifically, the control unit 11 calculates, for each directory of the reference source classification scheme, the difference between the previously acquired number of documents and the currently acquired number of documents. Then, the control unit 11 checks whether or not there is a directory satisfying the condition that the difference exceeds a predetermined threshold (i.e., that the number of documents has become greater than the threshold within the period from the time of the previous acquisition).

Then, the control unit 11 identifies the internal directory associated with the directory satisfying the above condition (directory in the reference source database (called "the reference directory")) from the directories included in the internal classification scheme stored in the storage unit 13 (called "the internal directories") by referencing the association table.

The control unit 11 generates guidance information for presenting the documents included in the identified internal directory. The guidance information here is a link to the identified internal directory described using HTML (Hyper Text Markup Language), for example, and a string explaining that link. The guidance information may also include a message that draws the attention of the user. When there is a request to access the document database, or when there is access to a predetermined directory (e.g., the root directory), the guidance information is displayed on the display unit 15 and presented to the user when the guidance information satisfies a predetermined presentation condition.

When the user clicks the generated link with the mouse of the operation unit 14, a list of the documents in the internal directory associated with that link is displayed on the display unit 15, and access to that internal directory becomes easy.

The control unit 11 may also be configured to store, in the memory unit 12, the date and time the guidance information was generated, and to delete the guidance information when a predetermined period of time has elapsed since the generation date and time.

Thus, access to classifications having a large degree of topicality is facilitated and convenience can be improved by presenting a link to the internal directory corresponding to the directory that is rapidly growing and whose number of documents exceeds a predetermined increase in the document management system 2.

Here, an example using a link was described, but a shortcut in Windows® or a symbolic link in UNIX® may also be used. The shortcut and symbolic link may be allocated in the root directory, for example.

As described above, some embodiments of the invention are outlined below.

According to an embodiment of the invention, the invention may be configured by a recording medium readable by a computer, the recording medium storing a document management program executable by the computer to perform a function for storing classification scheme information representing a predetermined classification scheme and for using the stored classification scheme information to classify and manage documents, the function including: using, as a reference source database, at least one external database that classifies and manages documents, and acquiring, as reference source classification scheme information, information relating to the classification scheme of the documents at the reference source database; determining, on the basis of the acquired reference source classification scheme information, how to change the stored classification scheme information; and changing the stored classification scheme information on the basis of the determined way of the changes when it has been decided to conduct changes.

The foregoing description of the embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

Figure 4:
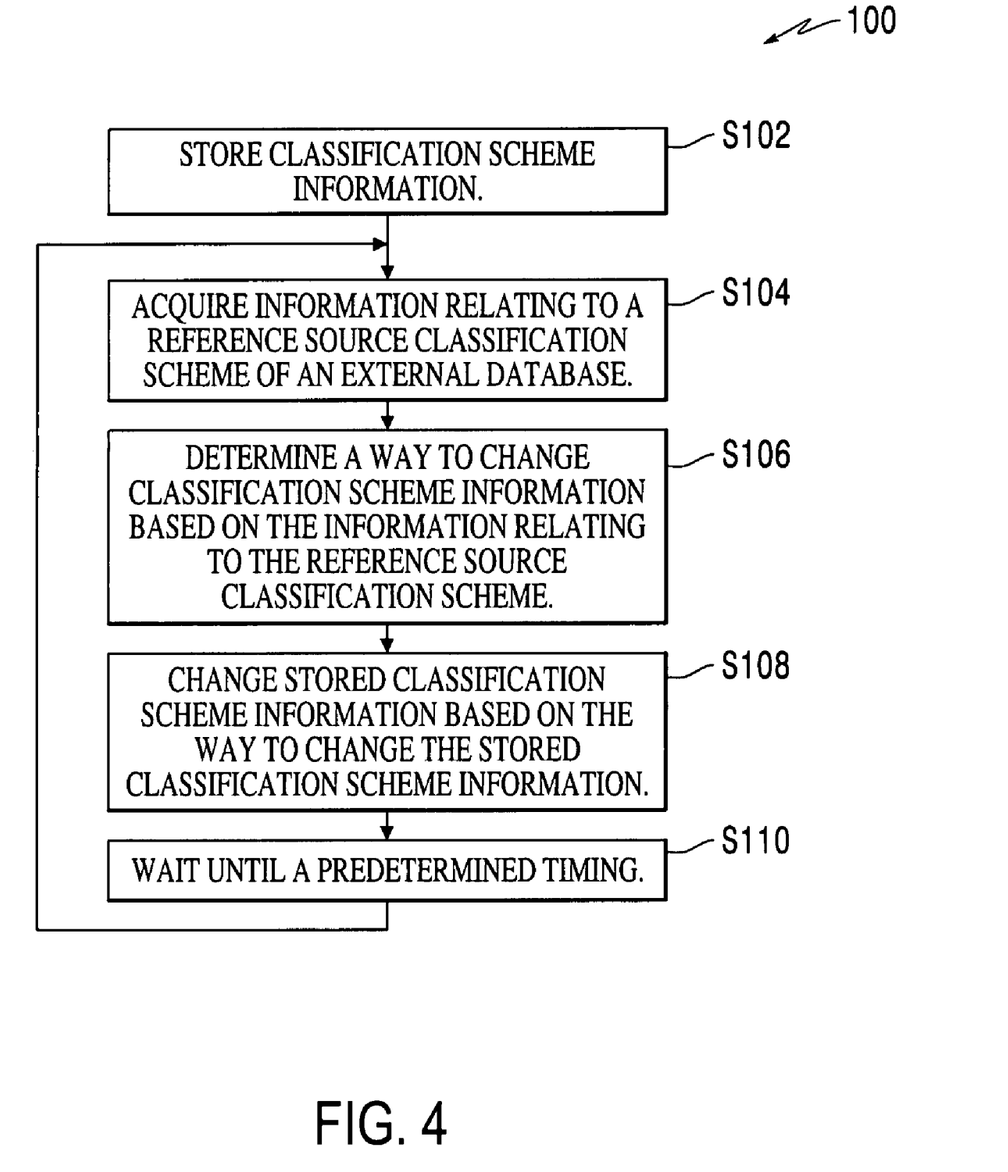
FIG. 4 shows a flowchart of an exemplary embodiment of a document management method.

FIG. 4 shows a flowchart for an exemplary embodiment of a document management method performed in a process of control unit 11, for example. In step 102, storage unit 13 stores classification scheme information, and the process goes to step 104. In step 104, the control unit 11 acquires information relating to a reference source classification scheme of an external database such as document management system 2 via network, and the process goes to step 106. In step 106, control unit 11 determines a way to change classification scheme information based on the information relating to the reference source classification scheme, and the process goes to step 108. In step 108, control unit 11 changes the classification scheme information stored in storage unit 13 based on a way to change the stored classification scheme information, and the process goes to step 110. In step 110, control unit 11 waits until a predetermined timing, and the process returns to step 104.

Figure 5:
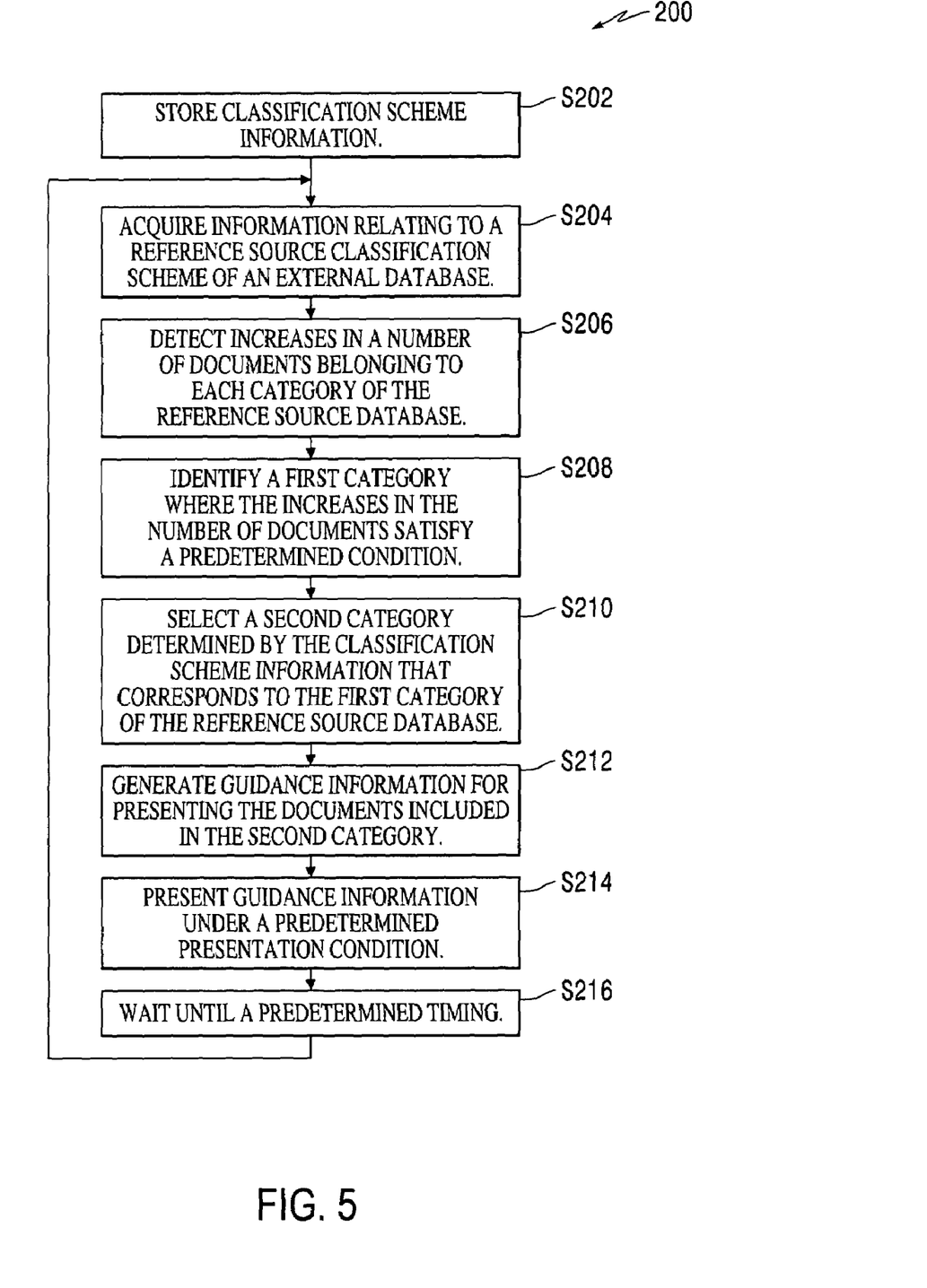
FIG. 5 shows a flowchart of another exemplary embodiment of a document management method.

FIG. 5 shows exemplary flowchart 200 for a document management method performed in a process of control unit 11, for example. In step 202, control unit 11 stores classification scheme information in storage unit 13, and the process goes to step 204. In step 204, control unit 11 acquires information relating to a reference source classification scheme of an external database via a network, and stores this information in memory unit 12. The process goes to step 206. In step 206, control unit 11 detects increases in a number of documents belonging to each category of the reference source database, based on the information stored in memory unit 12, and the process goes to step 208. In step 208, control unit 11 identifies a first category where the increases in the number of documents satisfy a predetermined condition, and the process goes to step 210. In step 210, control unit 11 selects a second category determined by the classification scheme information stored in storage unit 13 that corresponds to the first category of the reference source database, and the process goes to step 212. In step 212, control unit 11 generates guidance information for presenting the documents included in the second category, and the process goes to step 214. In step 214, display unit 15 presents guidance information under a predetermined presentation condition, and the process goes to step 216. In step 216, control unit 11 waits until a predetermined timing, and the process returns to step 204.

The entire disclosure of Japanese Patent Application No. 2004-203980 filed on Jul. 9, 2004 including specification, claims, drawings and abstract is incorporated herein by reference in its entirety.

What is claimed is:

1. A memory unit readable by a computer, the memory unit storing a document management program executable by the computer to perform a function for classifying and managing documents, the function comprising:

storing classification scheme information representing a classification scheme that is predetermined;

using at least one external database as a reference source database, the reference source database classifying and managing external database documents;

acquiring information relating to a reference source classification scheme of the external database documents, as reference source classification scheme information;

determining a way to change the classification scheme information based on the reference source classification scheme information;

changing the classification scheme information into a changed classification scheme information based on the way to change the classification scheme information;

retaining an association table that mutually associates categories included in the reference source classification scheme and categories included in the classification scheme; and adding a category included in the reference source classification scheme to the classification scheme information to create a corresponding category in the classification scheme information, in response to the category being include in the reference source classification scheme but no being associated with any of the categories included in the classification scheme, so that an internal corresponding parent directory, that corresponds to a parent directory of the category in the reference source classification scheme, is a parent directory of the corresponding category.

2. The memory unit of claim 1, the function further comprising updating classification of documents by using the changed classification scheme information.

3. A memory unit readable by a computer, the memory unit storing a document management program executable by the computer to perform a function for classifying and managing documents, the function comprising:

storing classification scheme information representing a classification scheme that is predetermined;

using at least one external database that classifies and manages external database documents as a reference source database;

acquiring information relating to a reference source classification scheme of the external database documents;

retaining an association table that mutually associates categories included in the reference source classification scheme and categories included in the classification scheme;

adding a category included in the reference source classification scheme to the classification scheme information to create a corresponding category in the classification scheme information, in response to the category being include in the reference source classification scheme but no being associated with any of the categories included in the classification scheme, so that an internal corresponding parent directory, that corresponds to a parent directory of the category in the reference source classification scheme, is a parent directory of the corresponding category;

detecting increases in a number of documents belonging to each category of the reference source database;

identifying a first category where the increases satisfy a predetermined condition;

selecting, from categories determined by the classification scheme information, a second category corresponding to the first category of the reference source database; and generating guidance information for presenting documents included in the second category, wherein the guidance information includes link information that causes a list of the documents in the second category to be presented under a predetermined presentation condition in response to a user selecting the link information.

4. A document management method of classifying and managing documents, the method comprising:
   storing classification scheme information in a memory unit, the classification scheme information representing a classification scheme that is predetermined;
   using at least one external database as a reference source database, the reference source database classifying and managing external database documents;
   acquiring information relating to a reference source classification scheme of the external database documents as reference source classification scheme information;
   determining a way to change the classification scheme information based on the reference source classification scheme information;
   changing the classification scheme information into changed classification scheme information based on the way to change the classification scheme information;
   retaining an association table that mutually associates categories included in the reference source classification scheme and categories included in the classification scheme; and
   adding a category included in the reference source classification scheme to the classification scheme information to create a corresponding category in the classification scheme information, in response to the category being include in the reference source classification scheme but no being associated with any of the categories included in the classification scheme, so that an internal corresponding parent directory, that corresponds to a parent directory of the category in the reference source classification scheme, is a parent directory of the corresponding category.

5. The document management method of claim 4, further comprising updating classification of documents by using the changed classification scheme information.

6. A document management method of classifying and managing documents, the method comprising:
   storing classification scheme information in a memory unit, the classification scheme information representing a classification scheme that is predetermined;
   using at least one external database as a reference source database; the reference source database classifying and managing external database documents;
   acquiring information relating to a reference source classification scheme of the external database documents;
   retaining an association table that mutually associates categories included in the reference source classification scheme and categories included in the classification scheme;
   adding a category included in the reference source classification scheme to the classification scheme information to create a corresponding category in the classification scheme information, in response to the category being include in the reference source classification scheme but no being associated with any of the categories included in the classification scheme, so that an internal corresponding parent directory, that corresponds to a parent directory of the category in the reference source classification scheme, is a parent directory of the corresponding category;
   detecting increases in a number of documents belonging to each category of the reference source database;
   identifying a first category where the increases satisfy a predetermined condition;
   selecting, from categories determined by the classification scheme information, a second category corresponding to the first category of the reference source database; and
   generating guidance information for presenting documents included in the second category,
   wherein the guidance information includes link information that causes a list of the documents in the second category to be presented under a predetermined presentation condition in response to a user selecting the link information.

7. A document management apparatus for classifying and managing documents, the document management apparatus comprising:
   a memory that stores classification scheme information representing a classification scheme that is predetermined;
   a control unit including a processor configured to execute a document management program, the control unit comprising:
   an acquisition unit that uses at least one external database as a reference source database, the reference source database classifying and managing external database documents, and acquires information relating to a reference source classification scheme of the external database documents as reference source classification scheme information,
   a determination unit that determines a way to change the classification scheme information based on the reference source classification scheme information, and
   a changing unit that changes the classification scheme information into changed classification scheme information based on the way to change the classification scheme information when the determination unit decides to conduct changes,
   wherein the memory retains an association table that mutually associates categories included in the reference source classification scheme and categories included in the classification scheme; and
   a category included in the reference source classification scheme is added to the classification scheme information to create a corresponding category in the classification scheme information, in response to the category being include in the reference source classification scheme but no being associated with any of the categories included in the classification scheme, so that an internal corresponding parent directory, that corresponds to a parent directory of the category in the reference source classification scheme, is a parent directory of the corresponding category.

8. The document management apparatus of claim 7, further comprising an updating unit that updates classification of documents classified by the classification scheme by using the changed classification scheme information.

9. A document management apparatus for classifying and managing documents, the document management apparatus comprising:
   a memory that stores classification scheme information representing a classification scheme that is predetermined;
   a control unit including a processor configured to execute a document management program, the control unit comprising:
   a unit that uses at least one external database as a reference source database, the reference source database classifying and managing external database documents, acquires information relating to a reference source classification scheme of the external database documents, and detects increases in a number of documents belonging to each category of the reference source database, a unit that identifies a first category where the increases satisfy a predetermined condition, a unit that selects, from categories determined by the classification scheme information, a second category corresponding to the first category of the reference source database, and a unit that generates guidance information for presenting documents included in the second category, wherein the memory retains an association table that mutually associates categories included in the reference source classification scheme and categories included in the classification scheme, a category included in the reference source classification scheme is added to the classification scheme information to create a corresponding category in the classification scheme information, in response to the category being include in the reference source classification scheme but no being associated with any of the categories included in the classification scheme, so that an internal corresponding parent directory, that corresponds to a parent directory of the category in the reference source classification scheme, is a parent directory of the corresponding category, and wherein the guidance information includes link information that causes a list of the documents in the second category to be presented under a predetermined presentation condition in response to a user selecting the link information.

* * * * *